(12) United States Patent
Euler et al.

(10) Patent No.: US 8,228,944 B1
(45) Date of Patent: Jul. 24, 2012

(54) COMMUNICATION SYSTEM AND METHOD FOR LINKING A COMMUNICATION NETWORK TO A CUSTOMER FACILITY

(75) Inventors: Timothy D. Euler, Shawnee Mission, KS (US); Harold W. Johnson, Roach, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 2413 days.

(21) Appl. No.: 10/748,547

(22) Filed: Dec. 30, 2003

(51) Int. Cl.
*H04J 3/16* (2006.01)

(52) U.S. Cl. ........ 370/468; 370/465; 370/328; 370/329; 370/338

(58) Field of Classification Search .................. 370/468, 370/445, 465, 328, 329, 338
See application file for complete search history.

(56) References Cited

U.S. PATENT DOCUMENTS

| | | | |
|---|---|---|---|
| 5,995,705 A * | 11/1999 | Lang | 386/46 |
| 6,272,127 B1 * | 8/2001 | Golden et al. | 370/352 |
| 6,351,223 B1 * | 2/2002 | DeWeerd et al. | 340/870.03 |
| 6,522,628 B1 * | 2/2003 | Patel et al. | 370/230.1 |
| 6,526,281 B1 * | 2/2003 | Gorsuch et al. | 455/452.1 |
| 6,681,232 B1 * | 1/2004 | Sistanizadeh et al. | 1/1 |
| 6,963,575 B1 * | 11/2005 | Sistanizadeh et al. | 370/404 |
| 7,133,617 B2 * | 11/2006 | Oettinger et al. | 398/123 |
| 7,161,953 B2 * | 1/2007 | Shenoi | 370/465 |
| 2002/0004788 A1 * | 1/2002 | Gros et al. | 705/80 |
| 2003/0048802 A1 | 3/2003 | Shenoi | |
| 2003/0074463 A1 | 4/2003 | Swartz et al. | |
| 2003/0123476 A1 | 7/2003 | Shenoi | |
| 2004/0213221 A1 * | 10/2004 | Civanlar et al. | 370/389 |
| 2005/0135490 A1 * | 6/2005 | Zimler et al. | 375/257 |

OTHER PUBLICATIONS

Loop Bonding Technology, Copyright 1998-2003 Net to Net Technologies, Inc. [online], [retrieved on Dec. 2, 2003] Retrieved from the Net to Net Technologies website using the Internet <URL: http://www.nettonet.com/solutions/loop-bonding/>.
Point-to-Point DSL Deployment in EMEA [online], [retrieved on Dec. 2, 2003] Retrieved from the Net to Net Technologies website using the Internet <URL: htpp://www.nettonet.com/solutions/whitepapers/emea-ptpshdsl.pdf>.

* cited by examiner

*Primary Examiner* — Anh-Vu H Ly
*Assistant Examiner* — Jay P Patel

(57) ABSTRACT

A communication system for linking a communication network to a customer facility is provided according to an embodiment of the invention. The communication system includes the communication network, a network-side Unbundled Network Element (UNE) interface connected to the communication network, a first wireless transceiver adapted to communicate with at least a second, customer facility wireless transceiver at the customer facility, a customer-side UNE interface connected to the first wireless transceiver, and a plurality of UNEs extending between the network-side UNE interface and the customer-side UNE interface. A communication session between the communication network and the customer facility can be established by selecting and bonding one or more UNEs from the plurality of UNEs to form one or more bonded UNEs and exchanging communications between the communication network and the first wireless transceiver over the one or more bonded UNEs.

15 Claims, 3 Drawing Sheets

COMMUNICATION SYSTEM AND METHOD FOR LINKING A COMMUNICATION NETWORK TO A CUSTOMER FACILITY

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to a communication system and method for linking a communication network to a customer facility.

2. Description of the Prior Art

Communication networks are widely used for conducting interpersonal and institutional communications, for data sharing, data storage and data backups, voice, video, and text communications, etc. As a result, communication networks have become widespread and ubiquitous. Many people require some form of communication network in order to work or function. In addition, the increased number of telecommuting and net-conferencing persons has accelerated the demand for digital communications.

A problem exists in the availability of communications networks. Communications networks currently rely heavily on landline communications systems wherein wires, cables, or fibers are used to connect various facilities and persons. A typical connection solution has been the installation of traditional telephone lines and/or cabling for a digital packet network.

Traditional connection solutions have several drawbacks. Telephone lines and digital packet network cabling provide a relatively low bandwidth and cannot offer a guaranteed Quality of Service (QoS). In addition, it is not practical, economical, or possible to run landlines to all desired locations and to all potential communications clients. Moreover, small groups of users may not provide the incentive to invest in and install new copper lines or optical fibers to a structure. This is often the case wherein the existing infrastructure was designed without anticipating the need for large bundles of cables, wires, or fibers. Furthermore, people often do not want to install unsightly or obstructive wires or cables.

Another common problem in the prior art is that many institutions or smaller businesses require a moderate level of bandwidth. However, the available choices are either the installation of low cost, low bandwidth telephone lines or expensive, high bandwidth cable or optical fiber links. Such high bandwidth links often provide more bandwidth than is desired or necessary. Moreover, the highest anticipated bandwidth need is often used to select the communication link, resulting in under-utilization of the communication link during normal operations and under a normal load.

SUMMARY OF THE INVENTION

The invention helps solve the above problems. Advantageously, the invention provides bandwidth-on-demand and can substantially match a bandwidth of a wireless transceiver. The invention can provide a suitable or desired communication capacity to a customer facility.

A communication system for linking a communication network to a customer facility is provided according to an embodiment of the invention. The communication system comprises the communication network, a network-side Unbundled Network Element (UNE) interface connected to the communication network, a first wireless transceiver adapted to communicate with at least a second, customer facility wireless transceiver at the customer facility, a customer-side UNE interface connected to the first wireless transceiver, and a plurality of UNEs extending between the network-side UNE interface and the customer-side UNE interface. A communication session between the communication network and the customer facility can be established by selecting and bonding one or more UNEs from the plurality of UNEs to form one or more bonded UNEs and exchanging communications between the communication network and the first wireless transceiver over the one or more bonded UNEs. The selecting and bonding provide bandwidth-on-demand between the network-side UNE interface and the customer-side UNE interface. The one or more bonded UNEs can be selected to substantially match a bandwidth of the first wireless transceiver.

A method for linking a communication network to a customer facility is provided according to an embodiment of the invention. The method comprises selecting one or more UNEs from a plurality of UNEs. The plurality of UNEs extend between a network-side UNE interface and the customer-side UNE interface. The network-side UNE interface is connected to the communication network and the customer-side UNE interface is connected to a first wireless transceiver that is adapted to communicate with at least a second, customer facility wireless transceiver at the customer facility. The method further comprises bonding the selected one or more UNEs to create one or more bonded UNEs and exchanging communications over the one or more bonded UNEs and between the communication network and the first wireless transceiver. The selecting and bonding provide bandwidth-on-demand between the network-side UNE interface and the customer-side UNE interface. The one or more bonded UNEs can be selected to substantially match a bandwidth of the first wireless transceiver.

A method for linking a communication network to a customer facility is provided according to an embodiment of the invention. The method comprises providing a network-side UNE interface connected to the communication network, providing a first wireless transceiver adapted to communicate with at least a second, customer facility wireless transceiver at the customer facility, providing a customer-side UNE interface connected to the first wireless transceiver, and providing a plurality of UNEs extending between the network-side UNE interface and the customer-side UNE interface. One or more UNEs can be selected from the plurality of UNEs and bonded in order to provide bandwidth-on-demand between the network-side UNE interface and the customer-side UNE interface and in order to substantially match a bandwidth of the first wireless transceiver.

BRIEF DESCRIPTION OF THE DRAWINGS

The same reference number represents the same element on all drawings.

DETAILED DESCRIPTION OF THE PREFERRED EMBODIMENT

Figure 1:
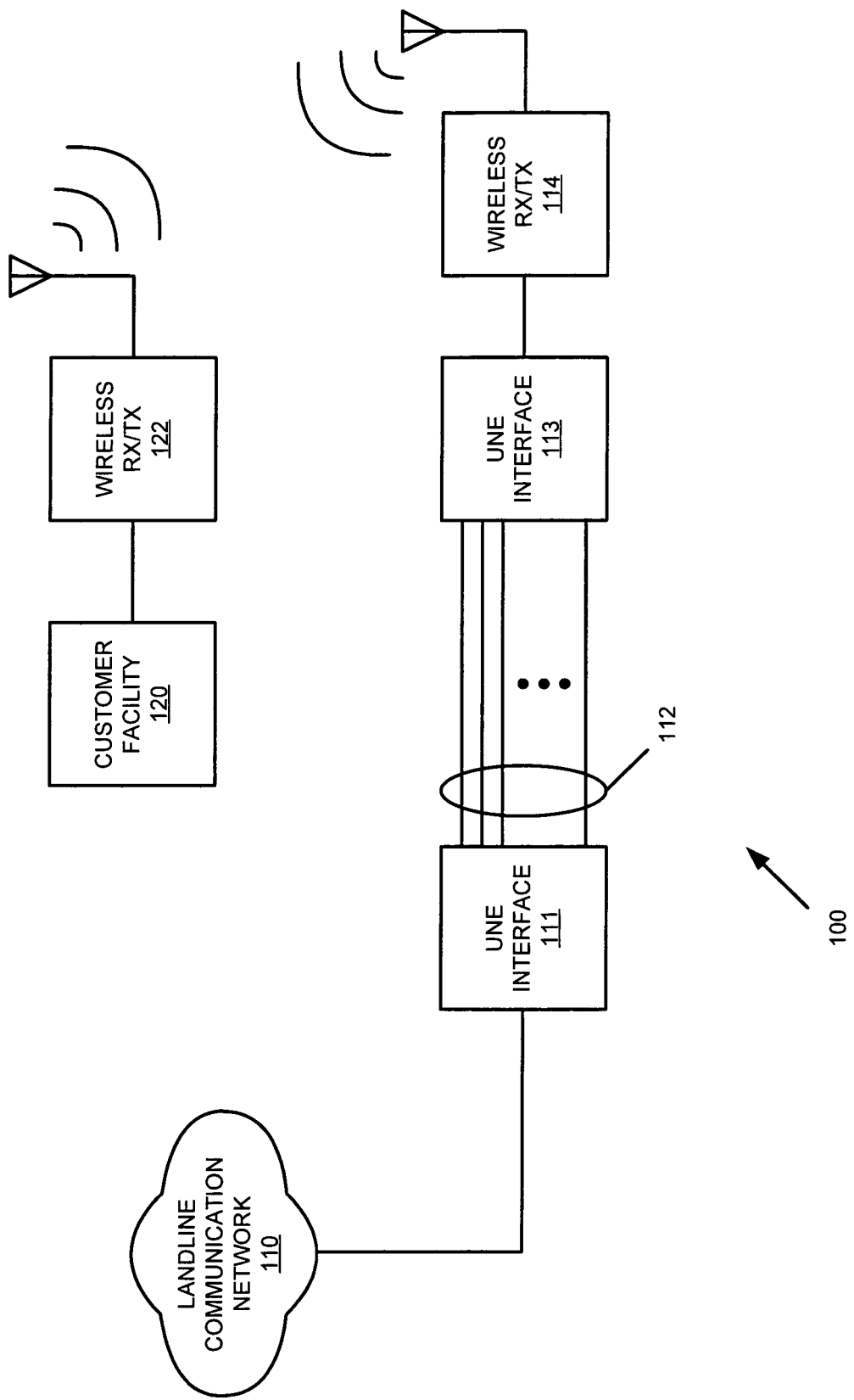
FIG. 1 is a diagram of a communication system for linking a communication network to a customer facility according to an embodiment of the invention.
Figure 2:
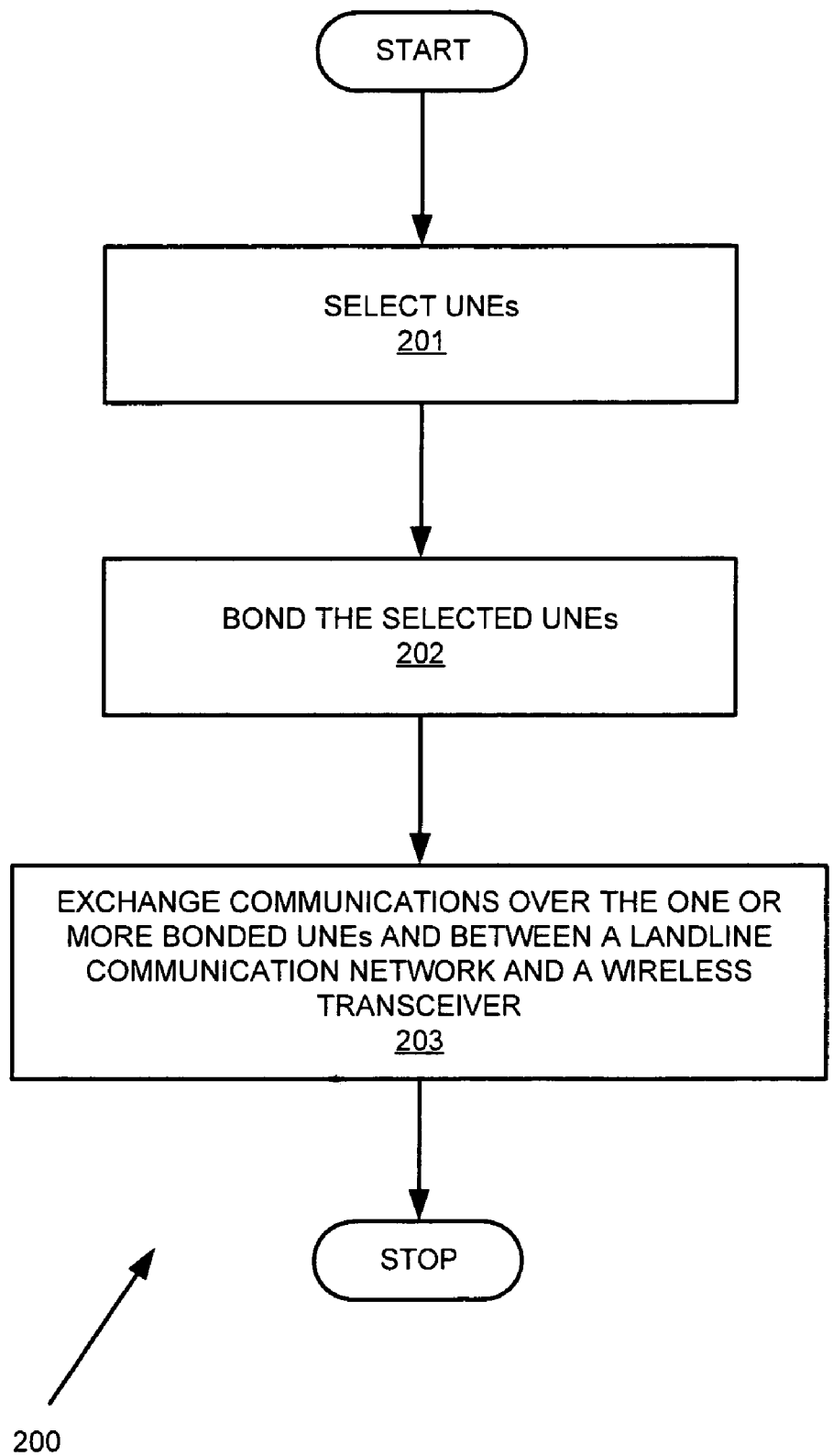
FIG. 2 is a flowchart of a method for linking a communication network to a customer facility according to an embodiment of the invention.
Figure 3:
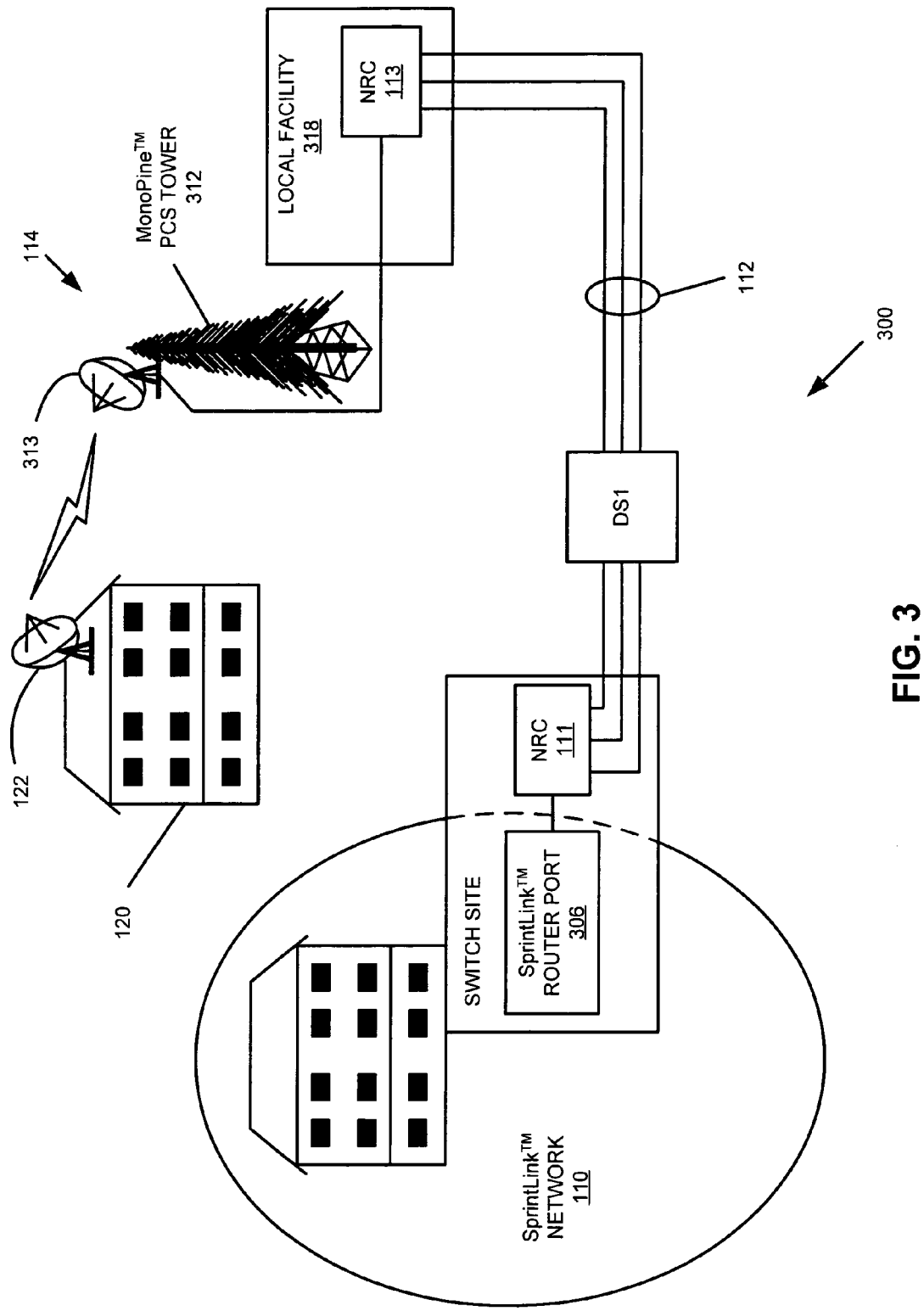
FIG. 3 is a diagram of a communication system for linking a communication network to a customer facility according to an embodiment of the invention.

FIGS. 1-3 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

FIG. 1 is a diagram of a communication system 100 for linking a communication network 110 to a customer facility 120 according to an embodiment of the invention. The communication system 100 includes the communication network 110, a network-side Unbundled Network Element (UNE) interface 111, one or more UNEs 112, a customer-side UNE interface 113, a first wireless transceiver 114, a second, customer facility wireless transceiver 122, and the customer facility 120.

The network-side UNE interface 111 is connected to the communication network 110. The customer-side UNE interface 113 is connected to the first wireless transceiver 114. The network-side UNE interface 111 and the customer-side UNE interface 113 can be connected by the one or more UNEs 112. The first wireless transceiver 114 conducts wireless communications with the second, customer facility wireless transceiver 122. The second, customer facility wireless transceiver 122 is located in the proximity of the customer facility 120 and is connected to the customer facility 120. The second, customer facility wireless transceiver 122 therefore provides wireless communication capability to the customer facility 120.

In operation, either the network-side UNE interface 111 or the customer-side UNE interface 113 can select and bond one or more of the UNEs 112 to form a communication channel therebetween. The one or more bonded UNEs, together with the wireless transceivers, form a communication channel between the communication network 110 and the customer facility 120. The communication channel can be temporary or substantially long-term in nature. The communication channel thus formed provides digital communication capability to the customer facility 120 without the need to hang, bury, or otherwise install dedicated landlines from the communication network 110 all of the way to the customer facility 120.

An Unbundled Network Element (UNE) 112 can comprise any manner of wire, cable, or fiber. In one embodiment, a UNE 112 comprises a pair of copper wires, such as a DSL telephone line pair. A DSL UNE 112 can include various DSL embodiments such as Asymmetric Digital Subscriber Line (ADSL), a High bit rate Digital Subscriber Line (HDSL), or a Symmetric Digital Subscriber Line (SDSL). In another embodiment, a UNE 112 comprises a DS-0 line providing a data rate of 64 Kbps, a DS-1/T-1 line providing a data rate of 1.544 Mbps, a DS-1C line (i.e., two T-1 lines) providing a data rate of 3.152 Mbps, a DS-2/T-2 line providing a data rate of 6.312 Mbps, a DS-3/T-3 line providing a data rate of 44.736 Mbps, or a DS-4/T-4 line providing a data rate of 274.176 Mbps. In yet another embodiment, a UNE 112 can comprise an OC-N optical carrier line of a Synchronous Optical NETwork (SONET), and therefore the UNE 112 can provide data rates ranging from 51.840 Mpbs (OC-1) to 39.812 Gbps (OC-768). OC-768 is currently the highest speed level defined for SONET. It should be noted that a UNE 112 can comprise other communication lines, line types, and communication protocols.

Bonding refers to multiplexing or spreading communication signals over multiple UNEs 112. For example, where each UNE 112 offers a bandwidth of 1.44 Mega bits per second (Mbps), two bonded UNEs 112 can be employed in order to achieve a bandwidth of 2.88 Mbps. In one embodiment, bonding is a technique for concatenating individual Time Division Multiplex (TDM) circuits, such as DS1, DS3, OC-N, etc., into an integrated communication channel. Thus, a bonding link could be a set of stacked DS1, DS3, or OC-N links. The links can be obtained from a Local Exchange Carrier (LEC) or from other service providers in the area. It should be noted that multiple UNEs 112 can be selected and bonded in order to achieve a desired aggregate bandwidth capacity.

A UNE interface comprises a multi-port, multiplexing device capable of selecting one or more connected UNEs 112 and bonding the selected UNEs 112 to form a communication channel comprising one or more bonded UNEs 112. In one embodiment, a UNE interface comprises a multi-port modem. A UNE interface can be obtained from network equipment manufacturers such as Nettonet, Ceterus, or Cisco, for example.

The communication network 110 can comprise any digital communication network that includes at least some landlines. In one embodiment, the communication network 110 can comprise a Plain Old Telephone System (POTS) communication network. In another embodiment, the communication network 110 can comprise an optical fiber communication network. In another embodiment, the communication network 110 can comprise a digital packet network, such as a Local Area Network (LAN), a Wide Area Network (WAN), a Metropolitan Area Network (MAN), the Internet, etc. In yet another embodiment, the communication network 110 can comprise a hybrid network including one or more of the above network types and can additionally include wireless link portions.

The wireless transceivers can comprise any type and frequency of wireless transceivers. In one embodiment, the wireless transceivers comprise radio transceivers that communicate using radio waves. In another embodiment, the wireless transceivers comprise microwave transceivers that communicate using microwave band radio waves. In yet another embodiment, the wireless transceivers comprise optical transceivers that communicate using light beams or pulses of light.

FIG. 2 is a flowchart 200 of a method for linking a communication network to a customer facility according to an embodiment of the invention. In step 201, one or more UNEs 112 are selected from the plurality of UNEs 112. The plurality of UNEs 112 extend between the network-side UNE interface 111 and the customer-side UNE interface 113. The network-side UNE interface 111 is capable of communicating with the communication network 110. The customer-side UNE interface 113 is capable of communicating with the customer facility 120 via the first wireless transceiver 114 and the second, customer facility wireless transceiver 122.

In step 202, the selected one or more UNEs 112 are bonded to create one or more bonded UNEs 112. The bonded UNEs 112 can be used to create a communications link of a desired bandwidth capacity.

In step 203, communications are exchanged over the one or more bonded UNEs 112 and between the communication network 110 and the first wireless transceiver 114. The communications can be uni-directional or bi-directional. The selecting and bonding provide bandwidth-on-demand between the network-side UNE interface 111 and the customer-side UNE interface 113. The one or more bonded UNEs 112 can be selected to substantially match a bandwidth of the wireless transceivers 114 and 122.

FIG. 3 is a diagram of a communication system 300 for linking a communication network 110 to a customer facility 120 according to an embodiment of the invention. The communication system 300 includes the communication network 110, the network-side UNE interface 111, the one or more UNEs 112, the customer-side UNE interface 113, the first wireless transceiver 114, and the second, customer facility wireless transceiver 122.

In this embodiment, the communication network 110 comprises a SprintLink™ communication network and a SprintLink™ router port 306 that is connected to the network-side UNE interface 111. The UNEs 112 in this embodiment comprise multiple DS-1 lines that each provide a bandwidth of 1.544 Mbps. The customer-side UNE interface 113 can be located in an enclosure or existing facility, such as a local communication facility 318. The first wireless transceiver 114 in this embodiment includes a communication tower 312, such as a SPRINT™ PCS™ tower, which can be disguised or camouflaged, such as a pine tree, for example. The first wireless transceiver 114 also includes a transceiver/antenna 313, such as a dish antenna. The first wireless transceiver 114 in this embodiment is connected to the customer-side UNE interface 113 by a single mode fiber (SMF) or CAT 5 cable. The SMF or CAT 5 cable can comprise a UV protected fiber or cable. It should be understood that alternatively the transceiver component can be located in the local facility 318 and is connected to the antenna 313. The wireless transceivers 114 and 122 in this embodiment implement a TeraBeam™ GigaLink™ capable of high wireless data rates, such as 100 Mbps to 1 Gbps and beyond, for example.

The communication system and method according to the invention can be implemented according to any of the embodiments in order to obtain several advantages, if desired. The communication system and method according to the invention can provide bandwidth-on-demand between the network-side UNE interface 111 and the customer-side UNE interface 113. The communication system and method according to the invention can group together multiple UNEs 112 in order to substantially match a bandwidth of the first wireless transceiver 114. The communication system and method according to the invention can group together multiple UNEs 112 in order to achieve higher bandwidths/data rates. The number of UNEs 112 that are selected can depend on the desired data transmission and can vary between time-separated sessions even where the same amount of data is being transmitted. The communication system and method according to the invention can increase the bandwidth available over a given distance, as bandwidth for a DSL line decreases with the span. Therefore, if the length of the span from the network-side UNE interface 111 to the customer-side UNE interface 113 is large enough to significantly decrease the available bandwidth, the selecting and bonding can compensate by providing a higher, desired bandwidth using multiple UNEs 112. Bonding of two pairs of DSL copper wires will generally provide twice the bandwidth than a single pair of DSL copper wires. Another benefit is that Quality of Service (QoS) parameters or QoS requirements can be used to select and/or prioritize a user's bandwidth requirement. In addition, the communication system and method according to the invention can enable multiple service levels and can provide bandwidth to a user in bandwidth increments.

What is claimed is:

1. A communication system adapted for linking a communication network to a customer facility, the communication system comprising:
    the communication network;
    a network-side Unbundled Network Element (UNE) interface connected to the communication network;
    a first wireless transceiver adapted to communicate with at least a second wireless transceiver at the customer facility, the first wireless transceiver comprising at least one of a dish antenna, a radio transceiver, a microwave transceiver, and an optical transceiver capable of transmitting Personal Communication System (PCS) data;
    a customer-side UNE interface connected to the first wireless transceiver by one or more of a single mode fiber (SMF) and a category (CAT) 5 cable; and
    a plurality of UNEs extending between the network-side UNE interface and the customer-side UNE interface;
    wherein a communication session between the communication network and the customer facility can be established by selecting and bonding one or more UNEs from the plurality of UNEs to form one or more bonded UNEs and exchanging communications between the communication network and the first wireless transceiver over the one or more bonded UNEs;
    wherein the selecting and bonding provide bandwidth-on-demand between the network-side UNE interface and the customer-side UNE interface when the communication session is established and the one or more bonded UNEs are selected to substantially match a bandwidth of the first wireless transceiver.

2. The communication system of claim 1, wherein the network-side UNE interface selects and bonds the plurality of UNEs based on the bandwidth between the first wireless transceiver and the second wireless transceiver.

3. The communication system of claim 1, wherein the customer-side UNE interface selects and bonds the plurality of UNEs based on the bandwidth between the first wireless transceiver and the second wireless transceiver.

4. The communication system of claim 1, wherein the customer facility comprises one or more PCS communication devices.

5. The communication system of claim 1, wherein the customer facility comprises at least one PCS communication network and one or more PCS communication devices connected to the at least one PCS communication network.

6. A method for linking a communication network to a customer facility, the method comprising:
    selecting one or more UNEs from a plurality of UNEs, with the plurality of UNEs extending between a network-side UNE interface and the customer-side UNE interface, with the network-side UNE interface being connected to the communication network and with the customer-side UNE interface being connected to a first wireless transceiver that is adapted to communicate with at least a second, customer facility wireless transceiver at the customer facility, wherein the customer-side UNE interface is connected to the first wireless transceiver by one or more of a single mode fiber (SMF) and a category (CAT)

5 cable, and wherein the first wireless transceiver comprises at least one of dish antenna a radio transceiver, a microwave transceiver, and an optical transceiver capable of transmitting Personal Communication System (PCS) data;

bonding the selected one or more UNEs to create one or more bonded UNEs; and exchanging communications over the one or more bonded UNEs and between the communication network and the first wireless transceiver;

with the selecting and bonding providing bandwidth-on-demand between the network-side UNE interface and the customer-side UNE interface when a communication session is established, and wherein the one or more bonded UNEs are selected to substantially match a bandwidth of the first wireless transceiver.

7. The method of claim 4, wherein the network-side UNE interface selects and bonds the plurality of UNEs.

8. The method of claim 4, wherein the customer-side UNE interface selects and bonds the plurality of UNEs.

9. The method of claim 4, wherein the customer facility comprising one or more PCS communication devices.

10. The method of claim 4, wherein the customer facility comprising at least one PCS communication network and one or more PCS communication devices connected to the at least one PCS communication network.

11. A method for linking a communication network to a customer facility, the method comprising:

providing a network-side UNE interface connected to the communication network;

providing a first wireless transceiver adapted to communicate with at least a second wireless transceiver at the customer facility, the first wireless transceiver comprising at least one of a dish antenna, a radio transceiver, a microwave transceiver, and an optical transceiver capable of transmitting Personal Communication System (PCS) data;

providing a customer-side UNE interface connected to the first wireless transceiver by one or more of a single mode fiber (SMF) and a category (CAT) 5 cable; and providing a plurality of UNEs extending between the network-side UNE interface and the customer-side UNE interface;

wherein one or more UNEs can be selected from the plurality of UNEs and bonded in order to provide bandwidth-on-demand between the network-side UNE interface and the customer-side UNE interface when a communication session is established, and wherein the one or more bonded UNEs are selected in order to substantially match a bandwidth of the first wireless transceiver.

12. The method of claim 11, wherein the network-side UNE interface selects and bonds the plurality of UNEs.

13. The method of claim 11, wherein the customer-side UNE interface selects and bonds the plurality of UNEs.

14. The method of claim 11, wherein the customer facility comprises one or more PCS communication devices.

15. The method of claim 11, wherein the customer facility comprises at least one PCS communication network and one or more PCS communication devices connected to the at least one PCS communication network.

* * * * *